United States Patent [19]
Marinaccio

[11] 3,777,566
[45] Dec. 11, 1973

[54] TEMPERATURE COMPENSATED LIQUID METAL LEVEL INDICATOR

[75] Inventor: Lawrence Francisco Marinaccio, Wampum, Pa.

[73] Assignee: Mine Safety Appliances Company, Pittsburgh, Pa.

[22] Filed: Oct. 16, 1972

[21] Appl. No.: 297,875

[52] U.S. Cl............................................. 73/290 R
[51] Int. Cl............................................. G01f 23/26
[58] Field of Search ...................... 73/290 R, 304 R, 73/401, 398 R

[56] References Cited
UNITED STATES PATENTS

| 2,776,563 | 1/1957 | Holbert | 73/290 R |
| 3,058,345 | 10/1962 | Mastras | 73/304 |
| 3,678,748 | 7/1972 | Dziedzic | 73/290 R |

*Primary Examiner*—Donald O. Woodiel
*Attorney*—Thomas H. Murray et al.

[57] ABSTRACT

A liquid metal level indicator of the type in which the inductance of a reference coil is compared in a bridge circuit with that of an active coil whose lines of flux intersect a metal bath, and incorporating a shield of conductive material around the reference coil to compensate for variations in inductance of the reference coil due to temperature variations. Additionally, the invention resides in the provision of an indicator of the type described wherein the reference and active coils extend downwardly into a metal bath in side-by-side relationship whereby the level of the bath can be determined over a range extending from the extreme bottom of a container for the bath to the extreme top of the container.

6 Claims, 7 Drawing Figures

PATENTED DEC 11 1973 3,777,566
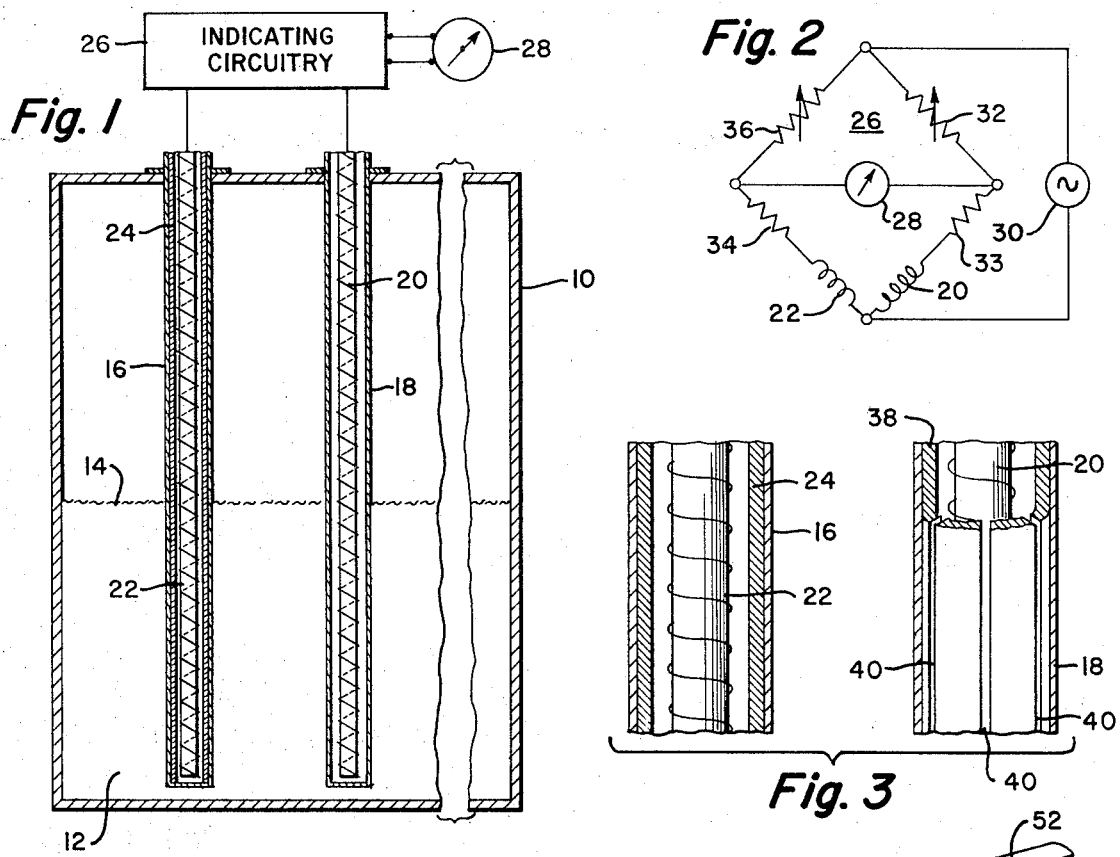
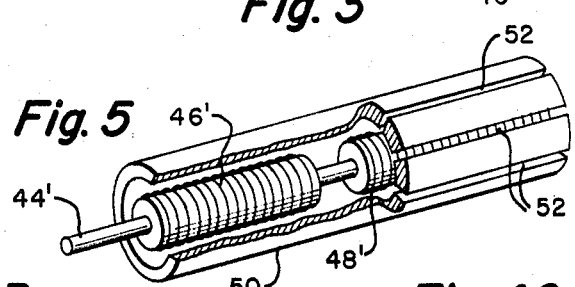
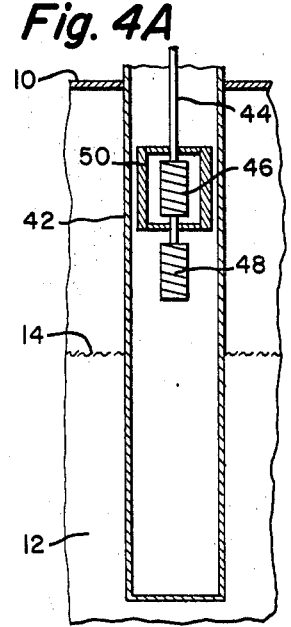
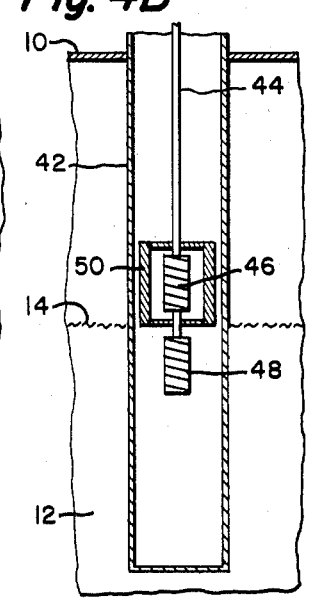
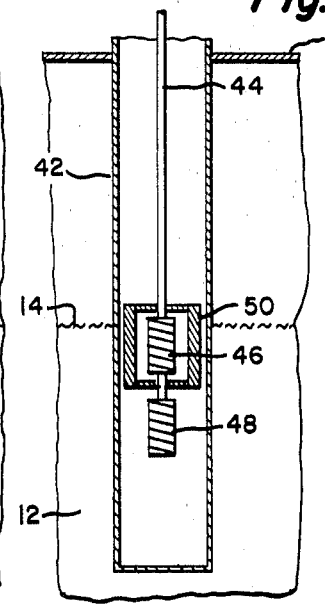

TEMPERATURE COMPENSATED LIQUID METAL LEVEL INDICATOR

BACKGROUND OF THE INVENTION

In the past, liquid level detectors for metallic baths have taken various forms; although the most common type comprises an elongated coil surrounded by a stainless steel tube and extending down into the bath whose level is to be detected. With an arrangement of this type, the coil acts as the primary of a transformer; while the surrounding liquid level bath acts as a single turn secondary connected to a load whose resistance is equal to the resistance of the bath. Interaction of the magnetic field set up by the coil with the liquid metal surrounding the tube causes the impedance of the coil to change as the level of the surrounding metal bath rises or falls. Therefore, by using the coil as one leg of a Wheatstone bridge, for example, the degree of unbalance of the bridge will be an indication of liquid level; and this unbalance can be calibrated to show level in feet, inches or the like.

In a level indicator or this type, the impedance of the coil and the conditions in the bridge change not only due to changes in the liquid metal bath but also due to changes in temperature. In order to compensate for this temperature effect, designers have used two coils, one above the other and connected in opposite legs of a bridge circuit, the arrangement being such that the changes in impedance due to temperature are canceled in the bridge.

Using two coils in opposite legs of a bridge circuit, however, has three major disadvantages. First, the reference coil is not at exactly the same temperature as the active coil because of a temperature gradient along the length of the probe when the tank is partially filled. That is, the reference coil must be above the level of the liquid bath; whereas the active coil, or at least part of the active coil, is beneath the level of the metal bath which is oftentimes at a different temperature. Secondly, the liquid metal level must always be below the reference coil so that its impedance change will be due to temperature only and not liquid level changes. If the liquid level drops below the top of the active coil, readings will be ambiguous and some auxiliary method must be employed to resolve the ambiguous reading. Thirdly because of the need to always keep the reference coil above the liquid surface, the valid operating range is restricted to something less than half the depth of the liquid.

In U.S. Pat. No. 3,058,345, a liquid metal level indicator is provided wherein two coils are arranged in side-by-side relationship and extend downwardly into a metal bath whose level is to be detected. One of these coils again acts as a reference coil while the other is an active coil. With this arrangement, the third disadvantage mentioned above is eliminated; however it requires a pair of stainless steel tubes of different diameters surrounding the respective coils to differentially couple the inductors to the metal such that as the level varies, the impedances of the inductors vary differentially in a manner which can be detected by a Wheatstone bridge. This arrangement, while possibly workable, is disadvantageous in that it requires different-sized stainless steel tubes for the respective active and reference coils and relatively high tolerance requirements.

SUMMARY OF THE INVENTION

In accordance with the present invention, an inductive-type liquid metal level indicator is provided wherein temperature compensation is provided by means of a shield of conductive material surrounding a reference coil whereby the lines of flux generated by the reference coils will not penetrate the shield and pass into the surrounding liquid level bath. This provides for a very accurate reference voltage across the Wheatstone bridge, regardless of the conditions existing in the liquid level bath around the reference coil. At the same time, the shield, because of its high heat conductivity characteristics, will insure that the temperature of the reference coil is substantially equal to that of the active coil.

In one embodiment of the invention shown herein, the reference and active coils are arranged in side-by-side relationship and extend all the way from the bottom of a container for liquid metal to its top. In this manner, the level of the bath can be determined over the entire depth of the container. The reference coil is surrounded by a shield of metal of high heat and electrical conductivity characteristics and is of such thickness that the lines of flux will not pass through it and into the surrounding metal bath. In this manner, the reference coil acts as a true standard for comparison irrespective of changes in temperature or characteristics of the bath.

Instead of using a shield around the reference coil only, shields of high heat and electrical conductivity can be provided around both the active and reference coils, with the shield around the active coil being slotted to permit lines of flux to pass into the liquid metal bath. With this arrangement, better temperature compensation is provided since both coils are subjected to an ambient whose temperature is dictated by a metal of the same heat transfer characteristics.

In another embodiment of the invention, the active and reference coils are positioned one above the other on a probe, and the probe moved upwardly or downwardly within a stainless steel tube or the like until the output from a Wheatstone bridge indicates that the liquid metal level is directly between the reference and active coils. The liquid level can then be read directly from a device mechanically or electrically connected to the movable probe.

As in the previous embodiment, of the invention described above, a shield of high electrical and heat conductivity characteristics surrounds the reference coil to insure that the two coils are at the same temperature and that the lines of flux from the reference coil do not pass through the shield. The shield, in this embodiment of the invention, can even extend over the active coil, thereby insuring better heat transfer characteristics and uniformity of temperature of the two coils. However, in this latter case, the portion of the shield which surrounds the active coil must be slotted or otherwise provided with some type of apertures in order to permit interaction of the magnetic field produced by the active coil with the surrounding liquid metal bath.

The above and other objects and features of the invention will become apparent from the following detailed description taken in connection with the accompanying drawings which form a part of this specification, and in which:

FIG. 1 is a schematic illustration of one embodiment of the invention wherein active and reference coils are disposed in side-by-side relationship and extend downwardly into a container for liquid metal;

FIG. 2 is a schematic circuit diagram of a Wheatstone bridge showing the manner in which the coils of FIG. 1 are connected to the bridge to indicate liquid level;

FIG. 3 illustrates an alternative embodiment of the invention of FIG. 1 wherein shields of high heat and electrical conductivity characteristics surround both the active and reference coils, that surrounding the active coil being slotted or otherwise aperatured;

FIGS. 4A, 4B and 4C illustrate another embodiment of the invention wherein the active and reference coils are positioned one above the other on a probe which moves upwardly and downwardly within a stainless steel tube of the like extending into a container for liquid metal; and FIG. 5 is a partially borken-away perspective view of another embodiment of the invention shown in FIGS. 4A–4C wherein a shield of high heat and electrical conductivity characteristics surrounds both the active and reference coils mounted on a probe.

With reference now to the drawings, and particularly to FIG. 1, a tank 10 is shown containing a liquid metal bath 12 whose upper level is indicated by the reference numeral 14. Extending downwardly into the tank, almost to the bottom thereof, are two stainless steel tubes 16 and 18 for reference and active inductive coils, respectively. The active coil is identified by the reference numeral 20 and is wound, for example, on an iron core; while the reference coil is identified by the reference numeral 22 and is also wound about an iron core or the like. The thickness of the stainless steel tube 18 is such that when the coil 20 is energized by means of alternating current, the resulting lines of flux will pass through the wall of th stainless steel tube 18 and into the liquid metal bath 12. In this respect, the coil or winding 20 acts as the primary winding of a transformer; whereas the surrounding liquid metal acts as a single turn secondary of the transformer with the liquid metal resistance comprising a load connected to the secondary. Furthermore, the inductance presented by the coil 20 will be dependent upon the amount of coupling between the magnetic field and the surrounding metal bath; and this, in turn, will depend upon the level 14 of the liquid metal.

The reference coil 22 is positioned within the copper or the like sleeve 24 extending along the entire length of the coil 22 and stainless steel tube 16. The sleeve 24 may be formed of other materials such as aluminum, just so long as it is a metal having high heat and electrical conductivity characteristics. The thickness of the copper shield 24 is such that magnetic lines of flux from coil 22 will not pass through the shield and into the surrounding metal bath. Consequently, the inductance presented by the coil 22 will at all times be constant except for temperature variations. In this respect, the copper shield 24 tends to insure that the temperature of coil 22 will always be equal to that of coil 20; and, therefore, the temperature effects on the respective coils will cancel out.

The two coils 20 and 22 are connected through indicating circuitry 26 to a meter 28 which indicates depth. The indicating circuitry 26 is shown in detail in FIG. 2 and comprises a Wheatstone bridge having two of its opposite terminals connected to a source of alternating current voltage 30. It should be understood, however, that any type of impedance bridge can be used in place of the Wheatstone bridge utilized in the specific embodiment of the invention shown herein. The frequency of voltage source may, for example, be in the range of 60 hertz to 10 kilohertz and is typically 1,650 hertz. Connected between the opposite two terminals of the Wheatstone bridge is the meter 28. The Wheatstone bridge includes the usual two legs one of which includes a variable resistor 32, the inductance or coil 20 and a resistance 33 representing the resistance of the inductor 20. Similarly, the second leg of the bridge circuit includes a variable resistor 36, the coil 22 and its resistance 34.

In the operation of the device of the invention, let us assume that the tank 10 is emptied of liquid metal. Under these circumstances, the depth indication should be zero, or essentially zero. Therefore, the variable resistors 32 and 36 can be adjusted until the bridge is balanced and the meter 28 indicates a zero reading or at least close to zero, depending upon how far down into the tank the coils 20 and 22 extend. Now, as the liquid level 14 rises, the inductance presented to the bridge circuit by coil 20 will vary, thereby unbalancing the bridge and causing the meter 28 to respond to the unbalance. The meter 28 can be calibrated, for example, to read directly in feet or inches of depth.

In FIG. 3, a modification of the embodiment of FIG. 1 is shown wherein the coil 22 and its surrounding copper shield 24 are the same. In this case, however, the coil 20 is also surrounded, within the tube 18, by a copper shield 38 provided with slots 40 through which magnetic lines of flux can pass and intersect the liquid metal bath. Alternatively, the copper shield 38 can be made thin enough to permit the lines of flux to pass through it and into the metal bath. In either case, the temperature gradient along both copper shields 24 and 38 will be the same, thereby insuring again that the temperatures to which the coils 20 and 22 are exposed along their entire lengths are the same and that temperature variations will not affect depth readings.

With reference now to FIGS. 4A, 4B and 4C, the level of the liquid metal bath 12 is again indicated by the reference numeral 14. In this case, however, only a single stainless steel tube 42 extends downwardly into the metal bath 12 through the top of a container 10. Reciprocable within the stainless steel tube 42 is a probe 44 which carries a pair of spaced coils 46 and 48, the coil 46 being the reference coil and the coil 48 being the active coil. In the position shown in FIG. 4A, for example, the coils 46 and 48, connected in a bridge circuit such as that shown in FIG. 2, are balanced; whereas, when the coil 48 is beneath the liquid metal bath 14 as shown in FIGS. 4B and 4C, the bridge becomes unbalanced. Consequently, by moving the probe 44 upwardly or downwardly, the location of liquid level can be determined. Alternatively, the coils 46 and 48 can remain stationary such that rising of the liquid level above a predetermined point can be determined by an unbalanced condition in the bridge. Note that the coil 46 is again surrounded by a copper or the like shield 50 through which the lines of flux from coil 46 will not pass. This makes the coil 46 insensitive to the presence of liquid metal and, at the same time, tends to insure that the temperature to which the coil 46 is subjected is the same as that of coil 48. Hence, unbalance of the bridge due to temperature variations does not occur.

In FIG. 5, still another embodiment of the invention is shown which is similar to that shown in FIG. 3, in that it can be applied to the general arrangement of FIGS. 4A–4C. Here a probe 44' again carried a reference coil 46' and an active coil 48'. In this case, however, the copper shield 50 surrounds both coils 46' and 48'. That portion surrounding the coil 48', however, is provided with slots 52 to permit the active coil to interact with the liquid metal bath. Slots 52, however, do not extend upwardly and over the reference coil 46'. Again, the slotted arrangement provides for more exact temperature matching of the two coils at perhaps a sacrifice in coupling between the sensing or active coil and the surrounding liquid metal bath.

Although the invention has been shown in connection with certain specific embodiments, it will be readily apparent to those skilled in the art that various changes in form and arrangement of parts may be made to suit requirements without departing from the spirit and scope of the invention.

I claims as my invention:

1. In a liquid metal level indicator of the type in which the impedance of a reference coil is compared in a bridge circuit or the like with that of an active coil whose lines of flux intersect a liquid metal bath; the combination of tube means extending down into said liquid metal bath for receiving said reference and active coils, and a metallic shield of high heat and electrical conductivity characteristics completely surrounding said reference coil to insure that the temperature of the active and reference coils will be essentially the same, the thickness of said shield being such as to insure that the lines of flux produced by the reference coil will not pass through the shield and penetrate the liquid metal bath.

2. The combination of claim 1 including metallic shield means of the same high heat and electrical conductivity characteristics surrounding said active coil, said latter-mentioned shield means having apertures therein to permit at least a portion of the lines of flux produced by said active coil to penetrate through said tube means and into a surrounding liquid metal bath.

3. The combination of claim 1 wherein said tube means comprises two tubes extending downwardly into a liquid metal bath, one of said tubes encasing said reference coil and a surrounding metallic shield of high heat and electrical conductivity characteristics and the other of said tubes encasing said active coil.

4. The combination of claim 1 wherein said active and reference coils are coaxially carried on a probe extending downwardly into said tube means, the active coil being below the reference coil.

5. The combination of claim 4 wherein said metallic shield extends over both said active and reference coils, and including slots in said metallic shield adjacent the active coil to permit lines of flux to pass through the shield and into the surrounding liquid metal bath.

6. The combination of claim 1 wherein said tube means is metallic and of such thickness to permit lines of flux produced by said active coil to pass therethrough and into a surrounding liquid metal bath.

* * * * *